United States Patent
Lee et al.

(10) Patent No.: US 8,268,477 B2
(45) Date of Patent: Sep. 18, 2012

(54) SECONDARY BATTERY WITH TOP SEALED PORTION OF IMPROVED STRUCTURE

(75) Inventors: Wooyong Lee, Chungcheongbuk-do (KR); Byungjin Choi, Daejeon (KR); Hyang Mok Lee, Daejeon (KR); Chang bum Ahn, Chungcheongbuk-do (KR); Jun Hwan Jang, Seoul (KR); Yunhee Hwang, Daejeon (KR)

(73) Assignee: LG Chem, Ltd. (KR)

( * ) Notice: Subject to any disclaimer, the term of this patent is extended or adjusted under 35 U.S.C. 154(b) by 498 days.

(21) Appl. No.: 12/309,911

(22) PCT Filed: Jul. 28, 2007

(86) PCT No.: PCT/KR2007/003644
§ 371 (c)(1),
(2), (4) Date: Sep. 8, 2009

(87) PCT Pub. No.: WO2008/016243
PCT Pub. Date: Feb. 7, 2008

(65) Prior Publication Data
US 2010/0047687 A1      Feb. 25, 2010

(30) Foreign Application Priority Data
Jul. 31, 2006    (KR) .................. 10-2006-0071831

(51) Int. Cl.
*H01M 10/04*      (2006.01)
*H01M 2/02*       (2006.01)
*H01M 2/30*       (2006.01)
*H01M 2/34*       (2006.01)

(52) U.S. Cl. ........................ 429/179; 429/185

(58) Field of Classification Search ................. 429/179, 429/185
See application file for complete search history.

(56) References Cited

U.S. PATENT DOCUMENTS

| | | | |
|---|---|---|---|
| 2003/0228515 A1* | 12/2003 | Woehrle et al. | 429/160 |
| 2005/0014036 A1* | 1/2005 | Kim | 429/7 |
| 2006/0035141 A1 | 2/2006 | Lee | |
| 2006/0166089 A1* | 7/2006 | Suzuki et al. | 429/185 |

FOREIGN PATENT DOCUMENTS

| | | | |
|---|---|---|---|
| JP | 11-260414 | A | 9/1999 |
| JP | 15257387 | A | 9/2003 |
| JP | 2004014516 | A | 1/2004 |
| JP | 2006032206 | A | 2/2006 |
| KR | 10-2000-0076825 | A | 12/2000 |
| KR | 10-2006-0045625 | A | 5/2006 |
| KR | 10-2006-0085179 | A | 7/2006 |

* cited by examiner

*Primary Examiner* — Gregg Cantelmo
(74) *Attorney, Agent, or Firm* — Lerner, David, Littenberg, Krumholz & Mentlik, LLP

(57) ABSTRACT

A secondary battery is manufactured by mounting an electrode assembly having a cathode/separator/anode structure into a pouch-shaped battery case and thermally welding the electrode assembly to the battery case, wherein a pair of insulative films are attached to opposite major surfaces of each electrode lead, to which electrode taps of the electrode assembly are electrically connected, at regions contacting an upper thermally-welded portion (upper sealed portion) of the pouch-shaped battery case, one of the insulative films, extends such that the lower end of the insulative film supports a coupled region where the electrode taps are coupled to the electrode lead, and the overlapping length between the insulative films is equal to or slightly greater than the height of the upper sealed portion.

8 Claims, 4 Drawing Sheets

*PRIOR ART*

[Fig. 3]
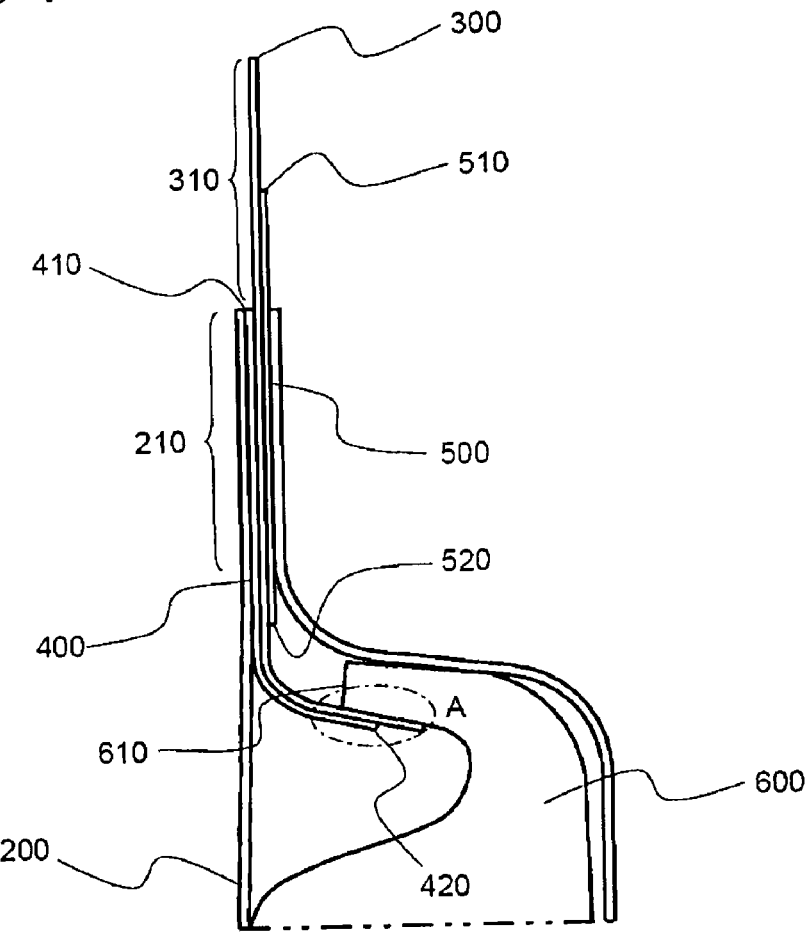
[Fig. 4]
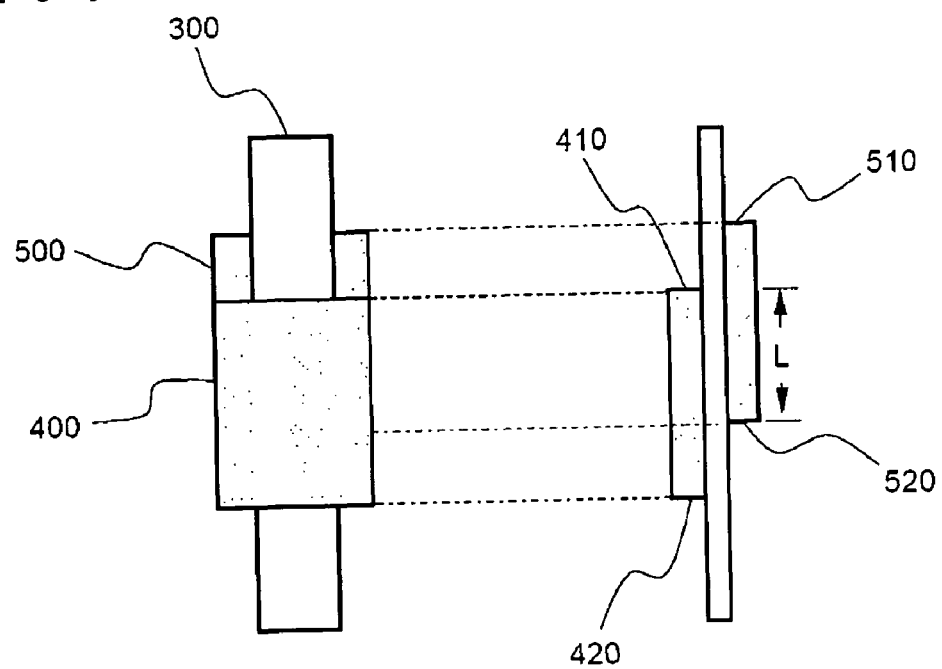

[Fig. 5]
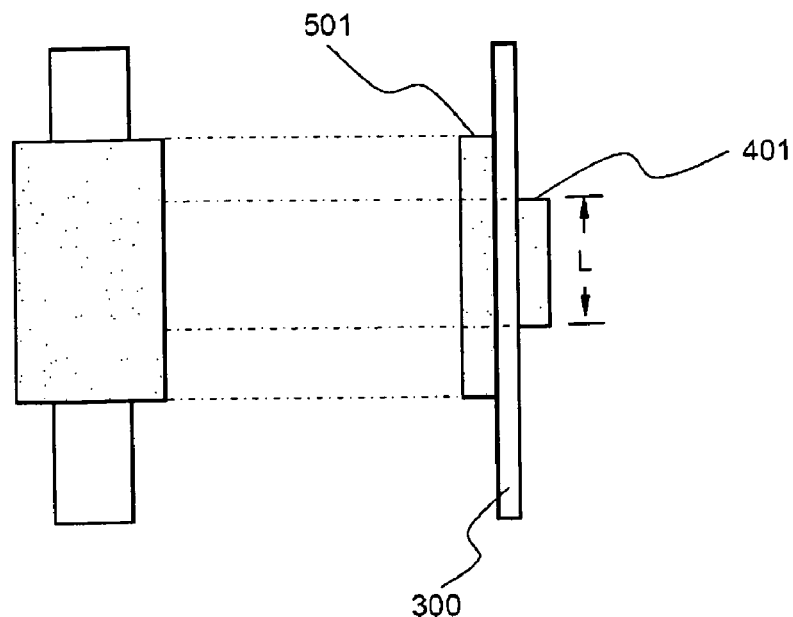
[Fig. 6]
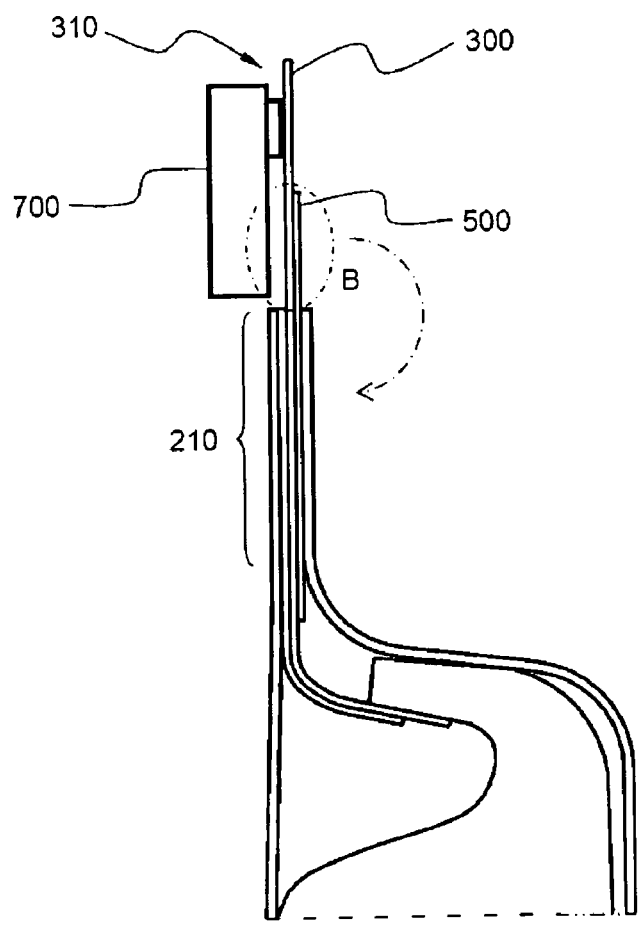

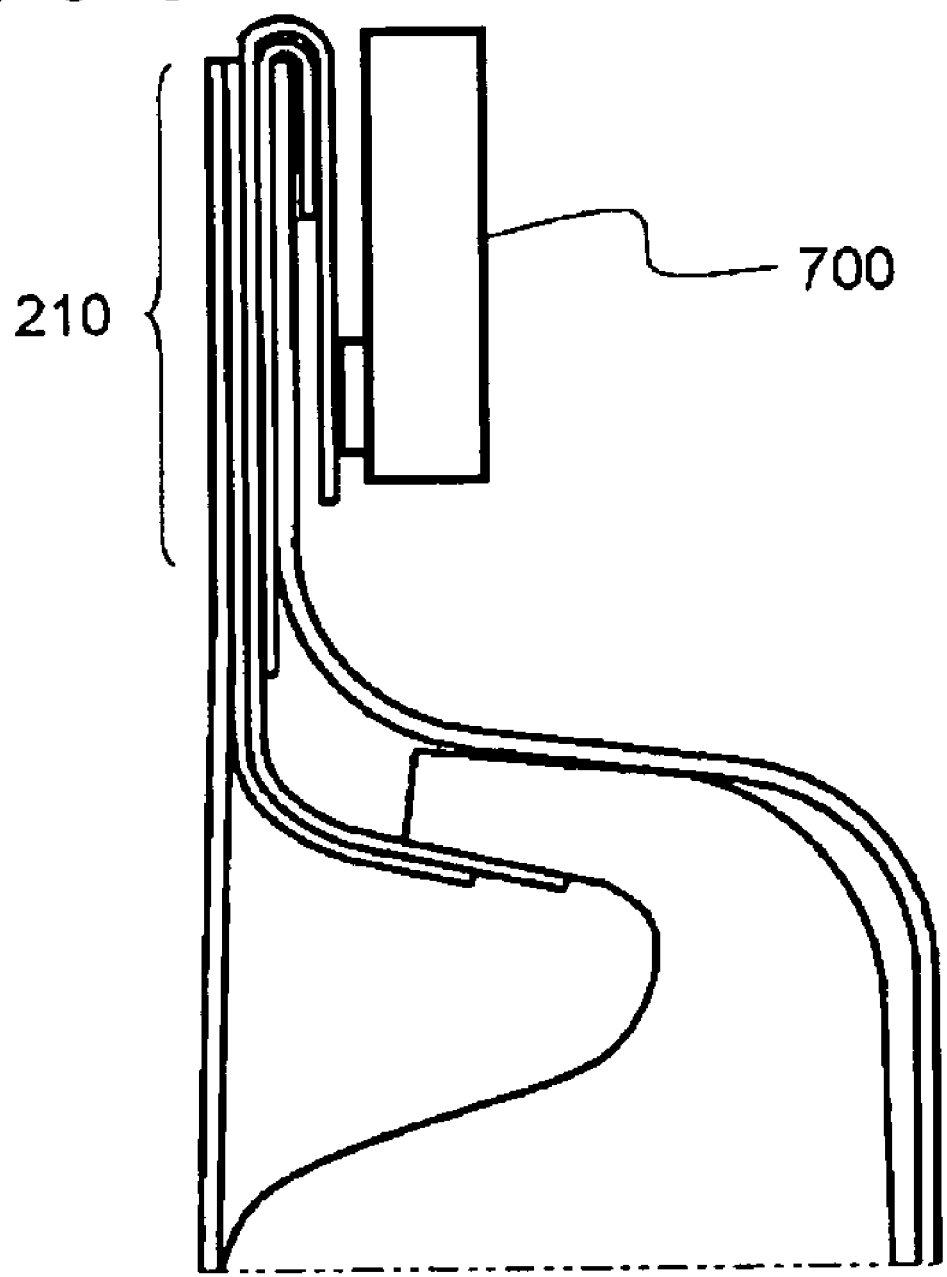

SECONDARY BATTERY WITH TOP SEALED PORTION OF IMPROVED STRUCTURE

CROSS REFERENCE TO RELATED APPLICATIONS

The present application is a national phase entry under 35 U.S.C. §371 of International Application No. PCT/KR2007/003644, filed Jul. 28, 2007, published in English, which claims priority from Korean Patent Application No. 10-2006-0071831, filed Jul. 31, 2006, all of which are incorporated herein by reference.

TECHNICAL FIELD

The present invention relates to a pouch-shaped secondary battery including a structurally improved upper sealed portion, and, more particularly, to a secondary battery manufactured by mounting an electrode assembly having a cathode/separator/anode structure into a pouch-shaped battery case and thermally welding the electrode assembly to the battery case, wherein a pair of insulative films are attached to opposite major surfaces of each electrode lead, to which electrode taps of the electrode assembly are electrically connected, at regions contacting an upper thermally-welded portion (upper sealed portion) of the pouch-shaped battery case, one of the insulative films a and b, i.e., the insulative film a, extends such that the lower end of the insulative film a supports a coupled region where the electrode taps are coupled to the electrode lead, and the overlapping length L between the insulative films a and b is equal to or slightly greater than the height H of the upper sealed portion.

BACKGROUND ART

As mobile devices have been increasingly developed, and the demand for such mobile devices has increased, the demand for batteries has also sharply increased as an energy source for the mobile devices. Accordingly, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having high energy density, high discharge voltage, and high output stability, is very high.

FIG. 1 is an exploded perspective view typically illustrating the general structure of a conventional representative pouch-shaped secondary battery.

Referring to FIG. 1, the pouch-shaped secondary battery 10 includes an electrode assembly 30, pluralities of electrode taps 40 and 50 extending from the electrode assembly 30, electrode leads 60 and 70 welded to the electrode taps 40 and 50, respectively, and a battery case 20 for receiving the electrode assembly 30.

The electrode assembly 30 is a power generating element comprising cathodes and anodes successively stacked while separators are disposed respectively between the cathodes and the anodes. Specifically, the electrode assembly 30 is constructed in a structure in which the electrode leads 60 and 70 are electrically connected to the electrode taps 40 and 50 extending from the cathodes and the anodes, respectively, for example, by welding. The electrode assembly 30 is mounted in the battery case 20 while the electrode leads 60 and 70 are partially exposed to the outside of the battery case 20. To the upper and lower surfaces of the electrode leads 60 and 70 are partially attached insulative films 80 for improving the sealability between the battery case 20 and the electrode leads 60 and 70 and, at the same time, for securing the electrical insulation between the battery case 20 and the electrode leads 60 and 70.

FIG. 2 is an enlarged view, in section, illustrating the upper end of a battery case of the secondary battery shown in FIG. 1, in which cathode taps are coupled to each other in a concentrated state and connected to a cathode lead, after the assembly of the secondary battery. For convenience of description, only the cathode lead is shown in FIG. 2. The structure of the cathode lead is identical to that of the anode lead.

Referring to FIG. 2, the plurality of cathode taps 40, which extend from cathode current collectors (not shown) of the electrode assembly 30, are coupled to each other, for example, by welding, and connected to one end of the cathode lead 60. The cathode lead 60 is thermally welded to an upper sealed portion 21 of the battery case 20, together with the insulative films 80, while the other end 61 of the cathode lead 60, which is opposite to the cathode taps 40, is exposed to the outside of the battery case 20. Two insulative films 80, attached to the cathode lead 60, overlap with each other at opposite major surfaces of the cathode lead 60, while the insulative films 80 have the same length. Consequently, upper ends 81 and the lower ends 82 of the insulative films 80 structurally coincide with each other. Generally, PP or PE having a thickness of approximately 80 to 100 □ is used as the insulative films. When the thermal welding process is performed, the insulative films are integrally fixed to the battery case 20 at the upper sealed portion 21 of the battery case 20.

When the electrode assembly 30 (see FIG. 1) frequently moves in the battery case due to various reasons, such as the application of small vibrations to the battery or the dropping of the battery, a region A of the cathode lead 60 corresponding to the front ends of the cathode taps 40, at the lower end of the cathode lead 60, to which the plurality of cathode taps 40 are attached, may break. Specifically, the region of the cathode lead 60 where the insulative films 80 are attached is protected from external force, whereas stress is concentrated on the region A of the cathode lead 60, which is frequently deformed due to the external force.

In addition, the insulative films 80 protrude partially outward from the upper sealed portion 21 of the battery case 20, and the insulative films 80 are attached to the opposite major surfaces of the cathode lead 60 at the protrusion region B in a symmetrical fashion. As a result, when the upper sealed portion 21 of the battery case 20 is bent to reduce the total length of the secondary battery 10 (see FIG. 1) or mount an element, such as a protection circuit module (not shown), it is difficult to bend the region B of the cathode lead 60 due to the insulative films 80, attached to the opposite major surfaces of the cathode lead 60.

In this connection, Japanese Patent Application Publication No. 2003-257387 discloses a secondary battery constructed in a structure in which an electrode assembly having a cathode/separator/anode arrangement is mounted in a battery case, pluralities of electrode taps, protruding from the electrode assembly, are connected to electrode leads, at least one of insulative films attached to opposite major surfaces of each electrode lead extends to a bent region where the electrode taps are bent to prevent a short-circuit of the electrode taps to the electrodes of the electrode assembly. Also, Japanese Patent Application Publication No. 1999-260414 discloses a secondary battery constructed in a structure in which thermally weldable polymer films are formed at the surfaces of electrode current collectors protruding outward from a battery case, and the polymer films are thermally welded to the battery case, the inner surface of which is made of thermally weldable polymer film, thereby improving the sealability of the battery case.

However, the above-described technologies do not suggest a structure to prevent the breakage of the electrode leads at the lower interfaces of the insulative films or solve the difficulty in bending the electrode leads at the upper protrusion regions of the insulative films.

Consequently, there is a high necessity for a technology that is capable of improving the structure of the insulative films thermally welded to the upper sealed portion of the battery case, thereby preventing the breakage of the electrode leads due to the movement of the electrode assembly when external forces, such as small vibrations and dropping, are applied to the battery, and, preferably, easily bending the electrode leads such that the PCM is mounted to the battery.

DISCLOSURE OF INVENTION

Technical Problem

Therefore, the present invention has been made to solve the above problems, and other technical problems that have yet to be resolved.

It is an object of the present invention to provide a secondary battery that is capable of preventing the breakage of electrode leads due to the movement of an electrode assembly when external forces, such as small vibrations and dropping, are applied to the secondary battery.

It is another object of the present invention to provide a secondary battery that is capable of easily bending the electrode leads such that a protection circuit module (PCM) is mounted to the secondary battery.

Technical Solution

In accordance with one aspect of the present invention, the above and other objects can be accomplished by the provision of secondary battery manufactured by mounting an electrode assembly having a cathode/separator/anode structure into a pouch-shaped battery case and thermally welding the electrode assembly to the battery case, wherein a pair of insulative films are attached to opposite major surfaces of each electrode lead, to which electrode taps of the electrode assembly are electrically connected, at regions contacting an upper thermally-welded portion (upper sealed portion) of the pouch-shaped battery case, one of the insulative films a and b, i.e., the insulative film a, extends such that the lower end of the insulative film a supports a coupled region where the electrode taps are coupled to the electrode lead, and the overlapping length L between the insulative films a and b is equal to or slightly greater than the height H of the upper sealed portion.

In the secondary battery according to the present invention, therefore, one of the insulative films a and b, i.e., the insulative film a, extends toward the electrode taps in the battery case to support the coupled region where the electrode taps are coupled to the electrode lead, thereby preventing the breakage of the electrode lead when stress is concentrated due to the frequent movement of the electrode assembly. Also, the overlapping length L between the insulative films a and b at the outside of the electrode assembly is minimized, whereby it is possible to easily bend the electrode lead such that a protection circuit module (PCM) is mounted to the electrode lead.

The electrode assembly is not particularly restricted so long as the electrode assembly is constructed in a structure in which the pluralities of electrode taps are connected to each other to constitute the cathode and the anode. Preferably, the electrode assembly is constructed in a stacking or stacking/folding type structure. The stacking/folding type electrode assembly is well known in the art to which the present invention pertains, and therefore, a detailed description of the stacking/folding type electrode assembly will not be given.

The battery case is constructed in a pouch-shaped structure made of a laminate sheet, specifically an aluminum laminate sheet, including a metal layer and a resin layer. The battery case is preferably applied to a pouch-shaped battery.

The overlapping length L between the insulative films a and b may be changed depending upon the height H of the upper sealed portion of the battery case. The height H of the upper sealed portion of the battery case may be changed depending upon the shape of the battery. Therefore, the overlapping length L between the insulative films a and b and the height H of the upper sealed portion of the battery case are not particularly restricted. Preferably, the sealed portion is formed with a height of 2 to 2.5 mm at the upper end of the battery case. Consequently, the overlapping length between the insulative films may be 2 to 2.5 mm or greater than the height of the upper sealed portion. Here, a thermal welding process for sealing the battery case may be performed entirely or partially at the upper sealed portion of the battery case. Consequently, the upper sealed portion is not necessarily a region where the thermal welding process must be performed.

In a preferred embodiment, the secondary battery is constructed in a structure in which a protection circuit module (PCM) is electrically connected to the outside end of the electrode leads, protruding from the upper sealed portion of the battery case, the electrode lead is bent toward the upper sealed portion, while the PCM is connected to the electrode lead, such that the PCM is mounted on the upper sealed portion. In this case, the empty space of the pouch-shaped secondary battery due to the upper sealed portion of the battery case is maximally utilized, and therefore, the volume of the secondary battery is minimized.

In the above-described structure, the bent region may be a region located above the upper sealed portion. Here, the region located above the upper sealed portion is a region where the bending process is performed such that the protrusion portion of the electrode lead, to which the PCM is mounted, is located above the upper sealed portion. The region may be the total length of the electrode lead extending to the end of the upper sealed portion or a part of the electrode lead protruding from the upper sealed portion. Specifically, the region may be a part of the electrode lead, adjacent to the end of the upper sealed portion, at the protrusion portion of the electrode lead.

Preferably, only one of the insulative films a and b, i.e., the insulative film a or the insulative film b, is attached to the region located above the upper sealed portion, corresponding to the bent region, in an asymmetrical fashion. Specifically, one of the insulative films is attached to one major surface of the protruding electrode lead, and the PCM is mounted to the other major surface of the electrode lead. Consequently, when the electrode lead is bent, such that the PCM is mounted on the upper sealed portion, the bending process is easily performed as compared to the bending of the electrode lead, having insulative films attached to the opposite major surfaces thereof according to the conventional art, because the insulative film is attached to only one major surface of the electrode lead according to the present invention. In this case, the bending of the electrode lead at the region located above the upper sealed portion is preferably performed toward the upper sealed portion where the insulative film is attached.

According to circumstances, the secondary battery may be constructed by bending the other end of the electrode lead protruding from the upper sealed portion of the battery case toward the upper sealed portion and connecting the PCM to the electrode lead such that the PCM is mounted on the upper sealed portion.

In a preferred embodiment, at least one of the insulative films a and b has a plurality of through-holes formed therein, thereby reducing the resistance when bending the electrode lead. During the thermal welding of the battery case, the insulative films are melted, the through-holes are filled with the molten insulative films, and the insulative films are solidified in the through-holes. As a result, the through-holes are clogged with the insulative films at the thermally welded region, and therefore, the through-holes do not affect the original function of the insulative films.

Preferably, the through-holes are formed in the insulative film placed at the region located above the upper sealed portion, corresponding to the bent region. For example, at least one insulative film a or b, having the plurality of through-holes formed at the position corresponding to the bent region, may be attached to the electrode lead.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a vertical sectional view, partly enlarged, illustrating the upper sealed portion of a battery case of a secondary battery according to a preferred embodiment of the present invention;

FIG. 4 is a typical view illustrating an electrode lead, having insulative films attached thereto, constituting the secondary battery of FIG. 3;

FIG. 5 is a typical view illustrating an electrode lead, having insulative films, which are modified from those of FIG. 4, attached thereto; and FIGS. 6 and 7 are vertical sectional views illustrating the upper sealed portion of a battery case of the secondary battery of FIG. 3 where a protection circuit module (PCM) is mounted to the secondary battery.

MODE FOR THE INVENTION

Figure 1:
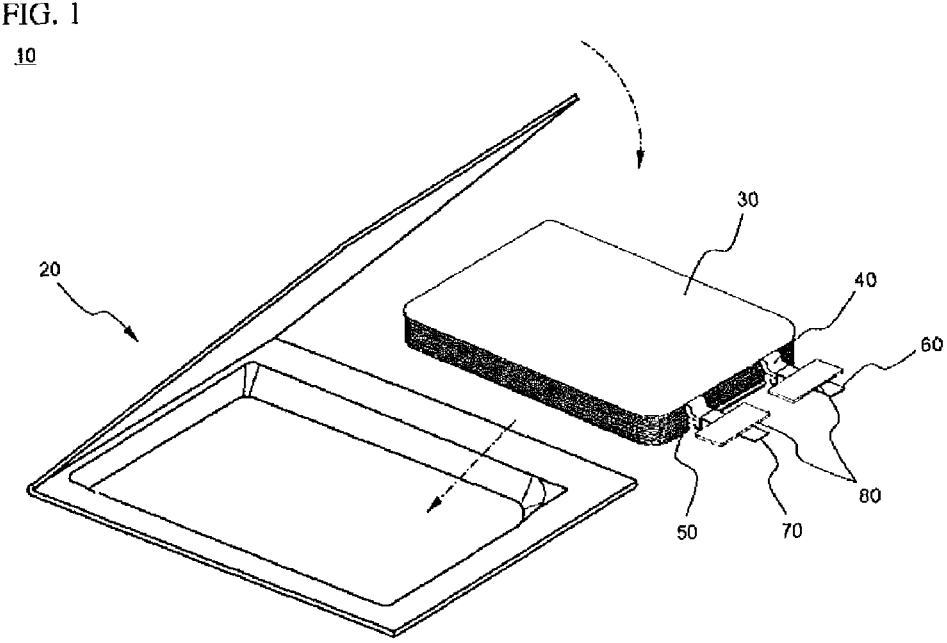
FIG. 1 is an exploded perspective view illustrating the general structure of a conventional pouch-shaped secondary battery.

Now, preferred embodiments of the present invention will be described in detail with reference to the accompanying drawings. It should be noted, however, that the scope of the present invention is not limited by the illustrated embodiments.

FIG. 3 is a vertical sectional view, partly enlarged, typically illustrating the upper sealed portion of a battery case of a secondary battery according to a preferred embodiment of the present invention. The pouch-shaped battery of FIG. 3 is very similar to a conventional pouch-shaped battery, which is generally being used, and therefore, the description of the secondary battery according to the present invention will not be given except for the characteristic items of the present invention. For convenience of description, the upper sealed portion will be simply referred to as a "sealed portion."

Referring to FIG. 3, a first insulative film 400 and a second insulative film 500 are attached to opposite major surfaces of an electrode lead 300 to increase the sealability between an aluminum laminate sheet and the electrode lead 300 at the upper sealed portion 210 of the battery case 200 and to secure the electrical insulation between the aluminum laminate sheet and the electrode lead 300 at the upper sealed portion 210 of the battery case 200.

The first insulative film 400 is attached to one major surface of the electrode lead 300 such that the upper end 410 of the first insulative film 400 is located at the position almost corresponding to the upper end of the sealed portion 210. The lower end 420 of the first insulative film 400 extends to electrode taps 600 such that the lower end 420 of the first insulative film 400 covers the lower end of the electrode lead 300 corresponding to the front ends 610 of the electrode taps 600, at a coupled region A where the electrode taps are coupled to the electrode lead.

As previously described, the coupled region A is a region where the breakage of the electrode lead 300 easily occurs due to frequent deformation of the electrode lead 300 when an external force is applied to the battery. However, the first insulative film 400 is attached to one major surface of the electrode lead 300 such that the first insulative film 400 covers the electrode lead 300, thereby preventing the breakage of the electrode lead 300.

On the other hand, the second insulative film 500 is attached to the other major surface of the electrode lead 300 such that the upper end 510 of the second insulative film 500 extends a predetermined height from the sealed portion 210 to a protrusion portion 310 of the electrode lead 300. The lower end 520 of the second insulative film 500 is located at the position almost corresponding to the lower end of the sealed portion 210.

This structure can be easily confirmed from FIG. 4, which typically illustrates the electrode lead having the insulative films attached thereto in a plan view and a vertical sectional view.

Referring to FIG. 4, the first insulative film 400 and the second insulative film 500 are attached to the opposite major surfaces of the electrode lead 300 in an asymmetrical structure in which the upper ends 410 and 510 of the first insulative film 400 and the second insulative film 500 do not coincide with each other at their positions, and the lower ends 420 and 520 of the first insulative film 400 and the second insulative film 500 do not also coincide with each other at their positions. The first insulative film 400 and the second insulative film 500 overlap with each other only at the sealed portion 210 (see FIG. 3) of the battery case 200. Specifically, the overlapping length L between the first insulative film 400 and the second insulative film 500 is approximately equal to the height of the sealed portion 210. In a modification of this structure, as shown in FIG. 5, a first insulative film 401 and a second insulative film 501, having different lengths, are attached to the opposite major surfaces of the electrode lead 300, to maintain the asymmetrical structure of the first insulative film 400 and the second insulative film 500 and secure the overlapping length L between the first insulative film 400 and the second insulative film 500.

FIGS. 6 and 7 are vertical sectional views illustrating the upper sealed portion of the battery case of the secondary battery of FIG. 3 where a protection circuit module (PCM) is mounted to the secondary battery.

Referring to these drawings, the secondary battery is constructed by electrically connecting the PCM 700 to the protrusion portion 310 of the electrode lead 300, and bending the electrode lead 300 in the direction indicated by an arrow such that the PCM 700 is located on the sealed portion 210. At this time, the bending of the electrode lead 300 is performed more easily than FIG. 2 because only the first insulative film 500 is attached to the bent region B of the electrode lead 300.

Figure 2:
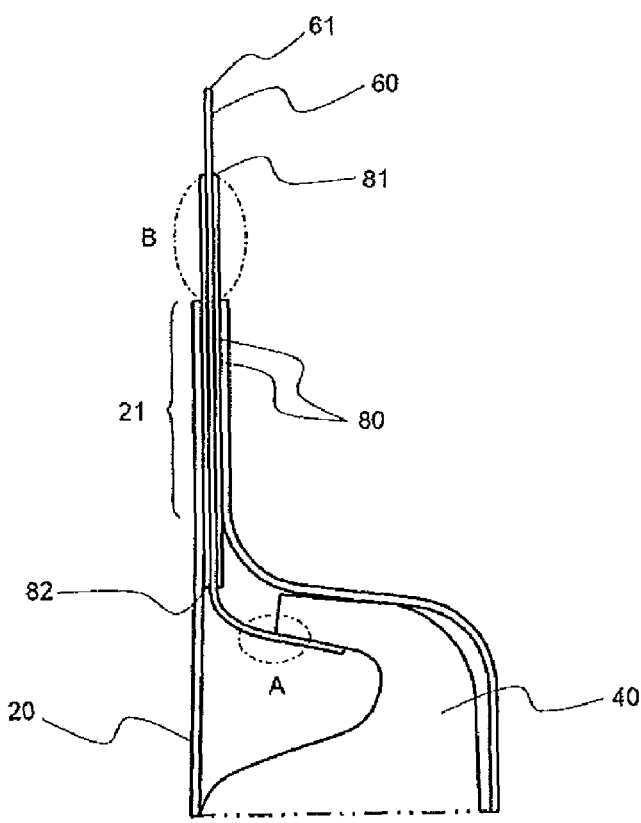
FIG. 2 is an enlarged view, in section, illustrating the upper end of a battery case of the secondary battery shown in FIG. 1, in which cathode taps are coupled to each other in a concentrated state and connected to a cathode lead, after the assembly of the secondary battery.

Further, in the structure of FIG. 2, since the insulative films 80 are attached to opposite major surfaces of the electrode lead 60 in a symmetrical fashion, the bending portion of the electrode lead 60 is made substantially around the upper end 81 of the insulative film 80. On the other hand, in the structure of FIG. 3, the electrode lead 300 can be bent around the upper end 410 of the first insulative film 400 and also the bent region B of the electrode lead 300 is supported by the second insulative film 500, whereby the stress concentration is reduced to increase the bending stability.

Hereinafter, examples of the present invention will be described in more detail. It should be noted, however, that the scope of the present invention is not limited by the illustrated examples.

EXAMPLE 1

Electrode taps of an electrode assembly were connected to electrode leads by welding, insulative films (made of polypropylene) were attached to opposite major surfaces of each electrode lead in an asymmetrical structure, as shown in FIG. 4, the electrode assembly was mounted in a battery case, the electrode assembly was impregnated with an electrolyte, and the battery case was sealed to manufacture a battery.

COMPARATIVE EXAMPLE 1

A battery was manufactured in the same method as Example 1 except that the insulative films were attached to the opposite major surfaces of each electrode lead in a symmetrical structure as shown in FIG. 2.

EXPERIMENTAL EXAMPLE 1

Small vibration experiments were performed with respect to mobile phones containing the batteries manufactured according to Example 1 and Comparative example 1, respectively. In the experiments, the small vibration were constantly applied to each ten (10) mobile phones until 12,000 cycles and the voltages of batteries were checked. The number of batteries of which the voltages were checked is indicated in Table 1 below. The small vibration experiments were performed in a condition that mobile phones employed with fully-charged batteries were placed in a drum formed in the shape of an octagonal prism, and the drum was rotated at 280 rpm.

TABLE 1

|  | Cycle | | | |
| --- | --- | --- | --- | --- |
|  | 0 | 6,000 | 9,000 | 12,000 |
| Example 1 | 10/10 | 10/10 | 10/10 | 10/10 |
| Comparative example 1 | 10/10 | 8/10 | 7/10 | 6/10 |

As can be seen from Table 1 above, in all the batteries manufactured according to Example 1, voltages were checked although the number of cycles was 12,000 at the small vibration experiments, whereas the voltages in four of the batteries manufactured according to Comparative example 1 were not detected. For the batteries manufactured according to Example 1, the coupled regions where the electrode taps were coupled to the electrode lead were supported by the insulative films, whereby the breakage of the electrode leads was prevented when the electrode assembly moved due to the small vibrations applied to the batteries. For the batteries manufactured according to Comparative example 1, on the other hand, the breakage of the electrode leads occurred due to the stress concentrated on the coupled regions where the electrode taps were coupled to the electrode lead.

EXPERIMENTAL EXAMPLE 2

In order to confirm the bending stability when the electrode leads were bent as shown in FIG. 7 for the purpose of mounting PCM, the bending experiments were performed with a method of ASTM D2176-97a with respect to ten (10) electrode leads to which insulative films were attached in a fashion of FIG. 3 ('Example 2') and ten (10) electrode leads to which insulative films were attached in a fashion of FIG. 2 ('Comparative example 2'). The experiments were performed in a condition that each electrode lead was mounted at a rotator machine with the tension of 400 g being applied to the electrode lead, and the orthogonal movement of the rotator machine was repeated from left (−90 degree) to right (+90 degree) with 175 rpm, then the number of bending cycle was measured until the breakage of electrode lead occurred. The results are indicated in Table 2 below.

TABLE 2

|  | Minimum number of bending cycle | Maximum number of bending cycle | Average number of bending cycle |
| --- | --- | --- | --- |
| Example 2 | 18 | 23 | 19.5 |
| Comparative example 2 | 11 | 14 | 12.3 |

As can be seen from Table 2 above, the average number of bending cycle in the electrode leads according to Example 2 was 19.5, whereas the average number of bending cycle in the electrode leads according to Comparative example 2 was 12.3. That is, the bending cycle of the electrode leads of Example 2 until breakage was higher by 7.2 than that of Comparative example 2. In the electrode leads of Example 2, the insulative films were attached to one major surface of the electrode lead except the overlapping part; accordingly, the electrode leads according to Example 2 were bent more easily than the electrode leads according to Comparative example 2. The electrode leads according to Comparative example 2 were substantially bent at the portion to which insulative films were not attached, due to the difficulty of bending at other portions. As such, the bending stability of the electrode leads according to Comparative example 2 was interior to that of electrode leads according to Example 2 in which the bent portion is supported by the insulative film attached to one major surface.

Industrial Applicability

As apparent from the above description, the secondary battery according to the present invention has the effect of preventing the breakage of the electrode leads due to the movement of the electrode assembly when external forces, such as small vibrations and dropping, are applied to the secondary battery, and, preferably, easily bending the electrode leads such that the PCM is mounted to the secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery manufactured by mounting an electrode assembly having a cathode/separator/anode structure into a pouch-shaped battery case and thermally welding the electrode assembly to the battery case, wherein a pair of insulative films are attached to opposite major surfaces of each electrode lead, to which electrode taps of the electrode assembly are electrically connected, at regions contacting an upper thermally-welded portion (upper sealed portion) of the pouch-shaped battery case, the first insulative film among the pair of insulative films extends such that the lower end of the first insulative film supports a coupled region where the electrode taps are coupled to the electrode lead, and the overlapping length between the pair of insulative films is equal to or slightly greater than the height of the upper sealed portion; and a protection circuit module electrically connected to the outside end of the electrode leads, protruding from the upper sealed portion of the battery case, the electrode lead being bent toward the upper sealed portion, while the protection circuit module is connected to the electrode lead, such that the protection circuit module is mounted on the upper sealed portion, wherein the region where the electrode lead is bent is located above the upper sealed portion, and wherein only one of the pair of insulative films is attached to the region located above the upper sealed portion, corresponding to the bent region, in an asymmetrical fashion.

2. The secondary battery according to claim 1, wherein the electrode assembly is constructed in a stacking or stacking/folding type structure.

3. The secondary battery according to claim 1, wherein the battery case is constructed in a pouch-shaped structure made of a laminate sheet including a metal layer and a resin layer.

4. The secondary battery according to claim 1, wherein the height of the upper sealed portion is 2 to 2.5 mm.

5. The secondary battery according to claim 1, wherein the bending of the electrode lead at the region located above the upper sealed portion is performed toward the upper sealed portion where the insulative film is attached.

6. A secondary battery manufactured by mounting an electrode assembly having a cathode/separator/anode structure into a pouch-shaped battery case and thermally welding the electrode assembly to the battery case, wherein a pair of insulative films are attached to opposite major surfaces of each electrode lead, to which electrode taps of the electrode assembly are electrically connected, at regions contacting an upper thermally-welded portion (upper sealed portion) of the pouch-shaped battery case, the first insulative film among the pair of insulative films extends such that the lower end of the first insulative film supports a coupled region where the electrode taps are coupled to the electrode lead, and the overlapping length between the pair of insulative films is equal to or slightly greater than the height of the upper sealed portion, wherein at least one of the pair of insulative films has a plurality of through-holes formed therein.

7. The secondary battery according to claim 6, wherein the through-holes are formed in the insulative film placed at the region located above the upper sealed portion, corresponding to the bent region, when the electrode lead is bent to mount the protection circuit module.

8. The secondary battery according to claim 7, wherein at least one of the pair of insulative films, having the plurality of through-holes formed at the position corresponding to the bent region, is attached to the electrode lead.

\* \* \* \* \*